W. & G. Bull,
Sawing Stone.
No. 14,277.   Patented Feb. 19, 1856.

UNITED STATES PATENT OFFICE.

WALLIS BULL AND GEO. BULL, OF TONAWANDA, PENNSYLVANIA.

MACHINE FOR SAWING MARBLE.

Specification of Letters Patent No. 14,277, dated February 19, 1856.

*To all whom it may concern:*

Be it known that we, WALLIS BULL and GEORGE BULL, of Tonawanda, in the county of Bradford and State of Pennsylvania, have invented a new and Improved Machine for Sawing Marble or Stone; and we do hereby declare that the following is a full, clear, and exact description of the same, reference being had to the annexed drawings, making a part of this specification, in which—

Figure 1:
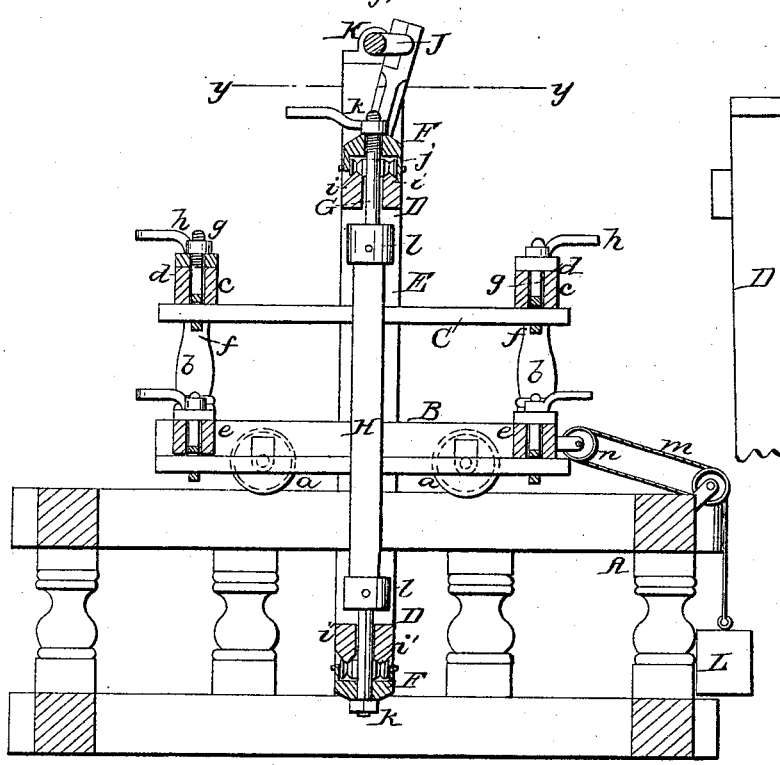
Figure 3:
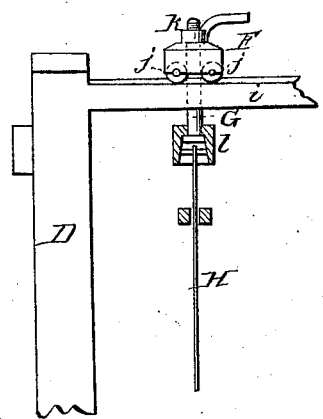
Figure 2:
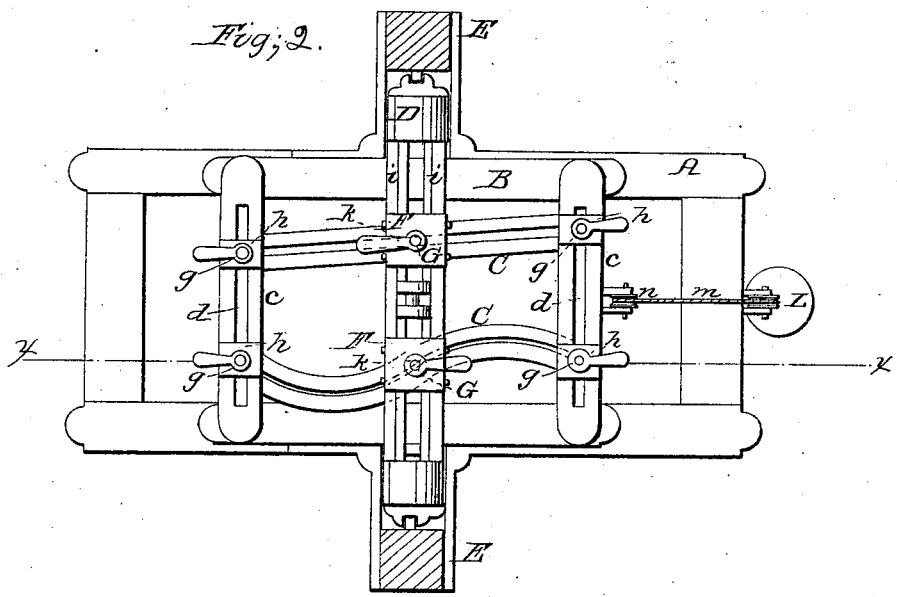

Figure 1, is a longitudinal vertical section of our improvement, $(x)$, $(x)$, Fig. 2, showing the plane of section. Fig. 2, is a horizontal section of ditto $(y)$ $(y)$, Fig. 1, showing the plane of section. Fig. 3, is a detached view of a portion of the saw frame, a portion of one saw being shown attached.

Similar letters of reference indicate corresponding parts in the several figures.

To enable those skilled in the art to fully understand and construct our invention, we will proceed to describe it.

A, represents a rectangular framing, on the upper part of which a carriage B, is placed, said carriage being upon wheels $(a)$ provided with flanches, the wheels of course bearing upon the upper part of the framing. At the front and back ends of the carriage B, there are attached uprights $(b)$ two at each end, and the upper parts of the uprights have cross pieces $(c)$ attached to them. The cross pieces $(c)$ have each a vertical slot $(d)$ made through them, the slots extending nearly the whole length of the cross pieces, and the end pieces $(e)$ $(e)$ of the carriage B, are also slotted in the same manner.

C, are guide bars the ends of which are secured in loops $(f)$ attached to the cross pieces $(c)$ $(c)$ and the end pieces $(e)$ $(e)$ of the carriage B. These loops have screw rods $(g)$ attached to them, which rods pass upward through the slots in the cross and end pieces, and have nuts $(h)$ on their upper ends. The guide bars are each slotted longitudinally, and there are two bars attached to the cross pieces $(c)$ $(c)$ and two to the end pieces $(e)$ $(e)$ of the carriage, the two upper bars being directly over or in line with the two lower ones.

D, represents a vertical saw frame which is fitted and works within a frame E, placed transversely with the framing A. The upper and lower cross pieces of the saw frame D, are formed each of two bars $(i)$ $(i)$ and $(i')$ $(i')$ the upper edges of the upper bars $(i)$ being beveled, and the lower edges of the lower bars $(i')$ $(i')$ being beveled in a similar manner.

F, represents similar boxes in which rollers $(j)$ are fitted, two in each box, these rollers are grooved so that the beveled edges of the bars $(i)$ $(i')$ may fit therein. Through each box or rod G, passes, the outer ends of said rods having screw threads cut on them to receive nuts $(k)$. The inner ends of the rods have boxes $(l)$ attached to them, one to each, and the ends of saws H, H, are secured in these boxes, the saws passing through the slotted guide bars C. The boxes $(l)$ are attached to the rods G, so that they may turn thereon like a swivel, see Fig. 3. The saws are properly strained in the saw frame D, by turning the nuts $(k)$.

A reciprocating motion is given the saw frame D, by means of a pitman I, and crank J, the crank being on a shaft K, on the upper part of the frame E.

The marble or stone block to be sawed is placed upon the carriage B, the block being kept to the saw by a weight L, which is attached to a chain $(m)$ one end of which is secured to the framing A, and passes around a pulley $(n)$ attached to the carriage. The guide bars C, are adjusted so that the saws H, H, may cut the sides of the block either parallel or angularly with each other, that is, if the guide bars be straight, but if the sides of the block are to be of curved form, curved guide bars are used, one of the upper and one of the lower guide are represented as curved. The saws H, H, are allowed to slide laterally on the bars $(i)$ $(i)$ in consequence of the rollers $(j)$ bearing thereon, and the guide bars C, consequently will give a lateral movement to the saws, while said saws are working up and down, so that the saws will cut the sides of the block of a form corresponding to the form and position of the guide bars. The saws also may if desired be made to cut the sides of the block obliquely by adjusting the guide bars, so as to place the saws in an inclined position.

Having thus described our invention, what we claim as new and desire to secure by Letters Patent, is,

We claim securing the saws H, H, in the frame D, by means of the boxes F, provided with rollers ($j$) and rods G, having on their inner ends swivel boxes ($l$) to which the ends of the saws are attached, whereby the saws may be properly strained in the saw frame and at the same time allowed to move laterally therein.

WALLIS BULL.
GEORGE BULL.

Witnesses:
C. T. SMITH,
D. VANDERCOOK.